US006305269B1

(12) United States Patent
Stratton

(10) Patent No.: US 6,305,269 B1
(45) Date of Patent: Oct. 23, 2001

(54) APPARATUS FOR PREPARING AND DISPENSING WHIPPED BEVERAGES

(76) Inventor: Gus J. Stratton, 15845 Business Center Dr., Irwindale, CA (US) 91706

( * ) Notice: Subject to any disclaimer, the term of this patent is extended or adjusted under 35 U.S.C. 154(b) by 0 days.

(21) Appl. No.: 09/518,118

(22) Filed: Mar. 3, 2000

(51) Int. Cl.[7] .............................. A23F 3/00; B65D 83/00

(52) U.S. Cl. .......................... 99/323.1; 99/275; 222/459; 366/165.1

(58) Field of Search ............................... 99/323.1, 323.3, 99/275; 222/129.1, 459; 366/165.1, 165.2, 137.1

(56) References Cited

U.S. PATENT DOCUMENTS 4,922,810 * 5/1990 Siccardi ............................ 99/293 X
5,000,351 * 3/1991 Rudick ............................ 222/459 X
5,570,822 * 11/1996 LeMarbe et al. .................... 222/459
5,938,327 * 8/1999 Benskin et al. ................... 366/137.1
5,980,969 * 11/1999 Mordini et al. ..................... 99/323.1

* cited by examiner

*Primary Examiner*—Reginald L. Alexander
(74) *Attorney, Agent, or Firm*—James E. Brunton, Esq

(57) ABSTRACT

An apparatus for producing and dispensing whipped soft drinks, hot chocolate and beverages which does not use mechanical whipping such as rotating blades, but rather accomplishes the whipping of the mixture of syrup and water used to produce the beverage by intermixing within a vented mixing chamber intersecting streams of syrup and water that are directed toward the intersection point under pressure. The apparatus embodies solenoid valves to control the flow of syrup and water into the mixing chamber of the apparatus.

11 Claims, 5 Drawing Sheets

FIG. 5
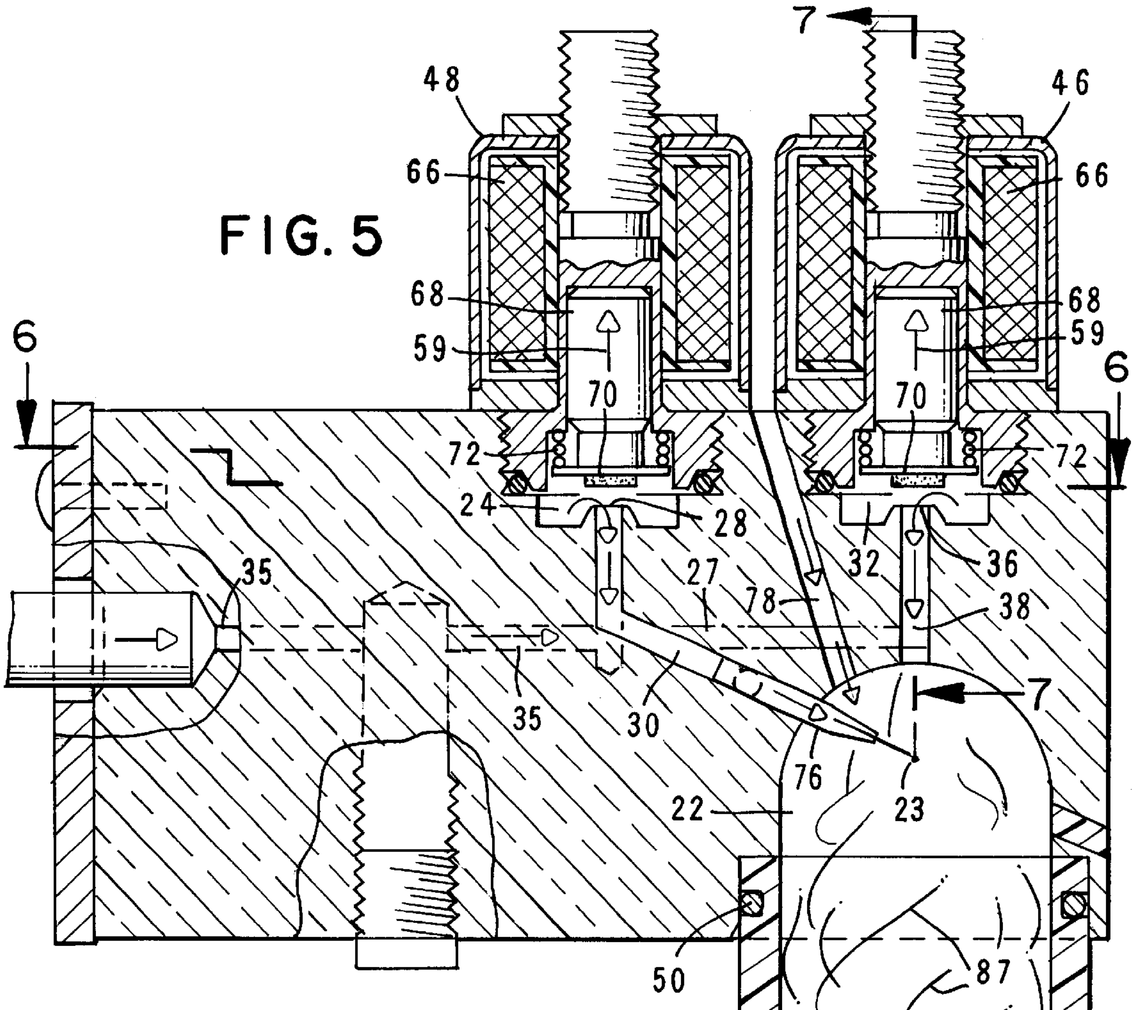
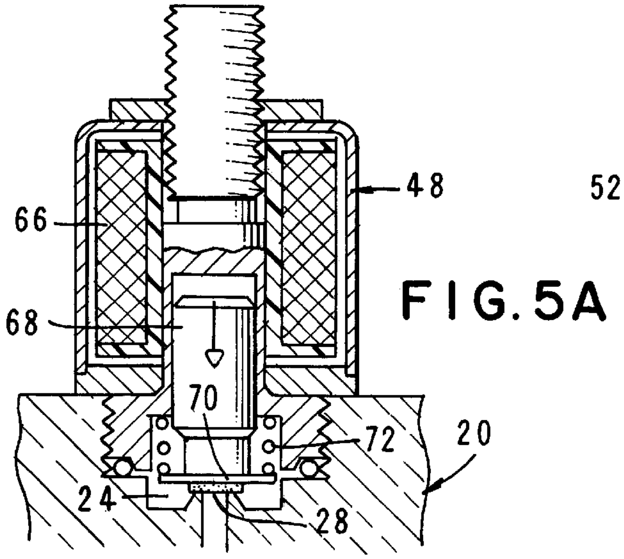
FIG. 5A

APPARATUS FOR PREPARING AND DISPENSING WHIPPED BEVERAGES

BACKGROUND OF THE INVENTION

1. Field of the Invention

The present invention relates generally to beverage dispensing apparatus. More particularly the invention concerns a novel apparatus for preparing and dispensing whipped beverages.

2. Discussion of the Prior Art

Typically, restaurants, including fast food restaurants, offer a variety of soft drinks with their meal services. The soft drinks generally comprise a combination of syrup, carbonated water, or tap water. Certain types of soft drinks are dispensed in a whipped condition. In the prior art, the whipping step was typically accomplished using mechanical whipping means such as one or more propeller like blades which are rotated at a relatively high rate of speed to whip the mixture of syrup and water. Exemplary of this type of apparatus is that described in U.S. Pat. No. 4,676,401 issued to Fox et al.

The rotating blade type of whipping apparatus is undesirable for several reasons. In the first place, if the mechanical portions of the apparatus are not continuously cleaned, the apparatus may jam and fail. Additionally, the National Sanitation Foundation (NSF) makes mandatory at least daily cleaning of the prior art whipping apparatus and such cleaning is costly and time consuming. Further, the prior art mechanical mixing devices are typically quite expensive, are somewhat unreliable and generally require continual maintenance. During washing and maintenance, the apparatus is, of course, out of service and cannot be used to accomplish beverage dispensing thus causing costly downtime.

The thrust of the present invention is to provide a novel apparatus for producing and dispensing whipped soft drinks, hot chocolate and like beverages that do not require the use of a mechanical whipping mechanism. More particularly, the apparatus of the present invention efficiently accomplishes the whipping and mixing step by directing a collimated stream of water toward an intersection point within a vented mixing chamber to which a stream of syrup is also strategically directed.

In one embodiment of the invention, the mixing chamber is formed interiorly of a mixing block and the collimated streams of water and syrup are directed toward the intersection point at a velocity sufficient to effectively accomplish the desired whipping action. Simultaneously, air drawn into the mixing chamber through a strategically located air passageway prevents a vacuum buildup within the chamber.

SUMMARY OF THE INVENTION

It is an object of the present invention to provide a novel apparatus for producing and dispensing whipped soft drinks, hot chocolate and like beverages which do not use mechanical whipping means such as rotating blades, but rather uniquely accomplishes the mixing and whipping of the syrup and water by causing collimated steams of the syrup and water to intersect at a mixing point located within a strategically shaped, vented mixing chamber.

Another object of the invention is to provide an apparatus of the aforementioned character, in which air is drawn into the mixing chamber through a strategically located air passageway to prevent a vacuum buildup within the chamber.

Another object of the invention is to provide a mixing apparatus which requires little maintenance and one which is easy to operate and is highly reliable in continuous use.

Another object of the invention is to provide an apparatus of the character described in the preceding paragraphs, which is of a simple construction and embodies a minimum number of moving parts.

Another object of the invention and apparatus for producing and dispensing whipped soft drinks that can be inexpensively produced and easily maintained in a clean and operable condition.

Another object of the invention is to provide an apparatus as described in the preceding paragraphs which embodies highly reliable solenoid valves to control the flow of syrup and water into the mixing chamber of the apparatus.

These and other objects of the invention will become apparent from the description which follows:

BRIEF DESCRIPTION OF THE DRAWINGS

FIG. 5 is an enlarged cross-sectional view taken along lines 5—5 of FIG. 4.

FIG. 5A is a fragmentary, cross-sectional of one of the solenoid valves of the apparatus showing the valve in a closed position.

BRIEF DESCRIPTION OF THE INVENTION

Figure 1:
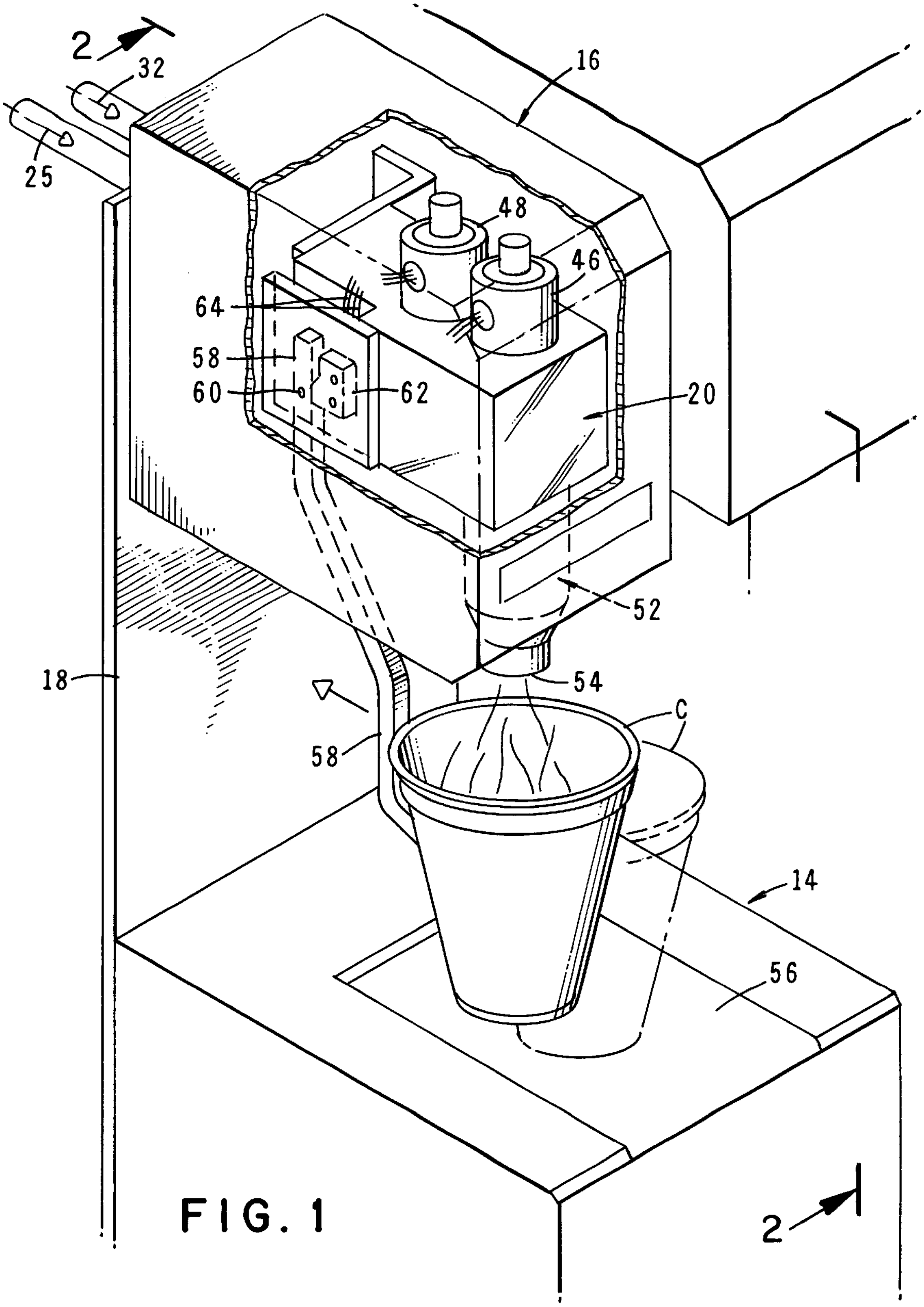
FIG. 1 is a generally perspective view of one form of the apparatus of the invention for mixing syrup and water to form a whipped beverage.
Figure 2:
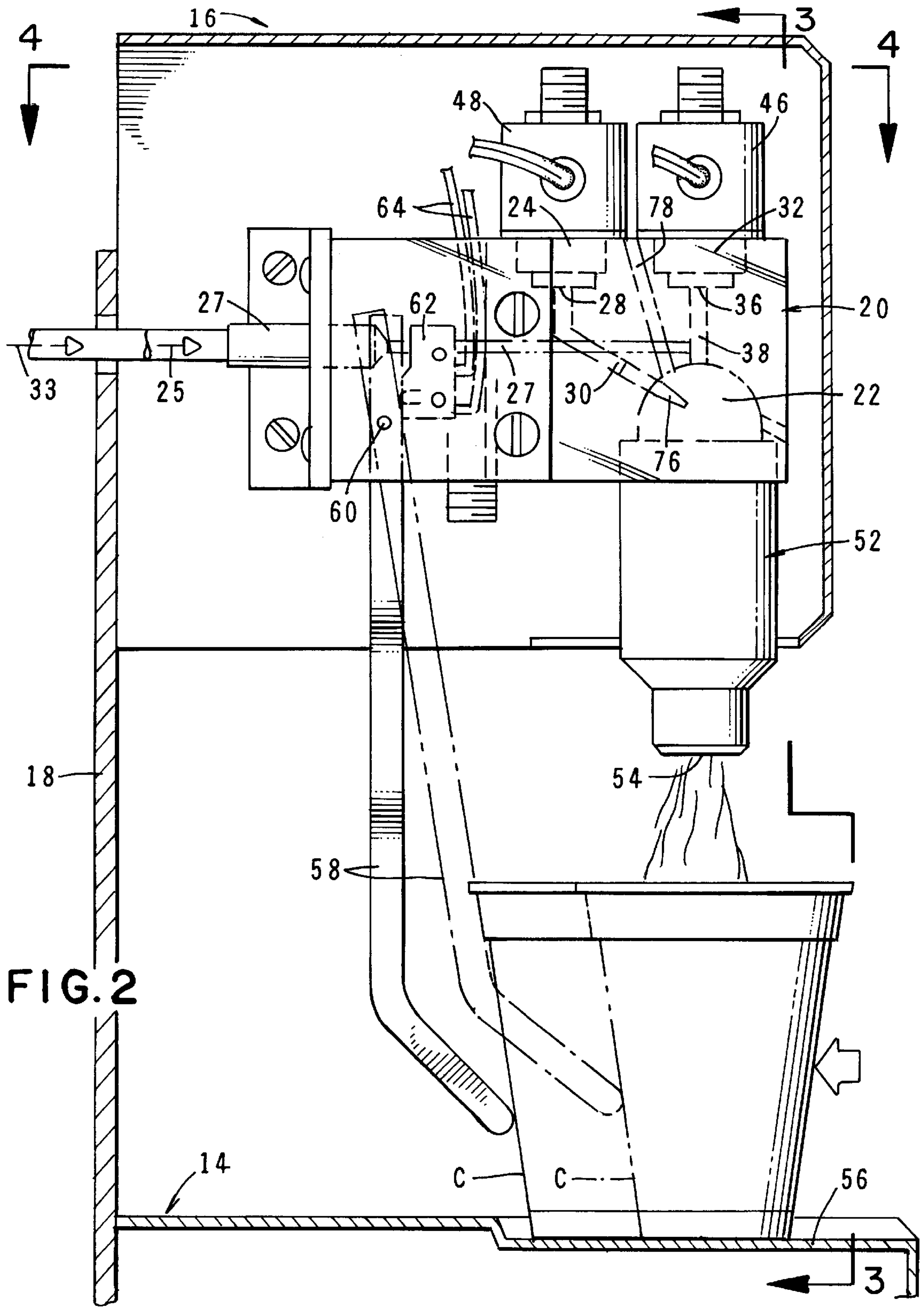
FIG. 2 is a cross-sectional view taken along lines 2—2 of FIG. 1.

Referring to the drawings and particularly to FIGS. 1 through 6, one form of the apparatus of the invention for producing and dispensing a whipped beverage is there shown. This form of the apparatus comprises a base unit 14, a hollow housing 16 superimposed over base 14 and a back panel 18 interconnecting base unit 14 and hollow housing 16. Disposed within hollow housing 16 is the important mixing block 20 of the invention in which the mixing of the syrup, water and air to produce the whipped beverage is accomplished. For this purpose, mixing block 20 includes an interior, generally hemispherically shaped mixing chamber 22 (FIGS. 2 and 5).

Figure 3:
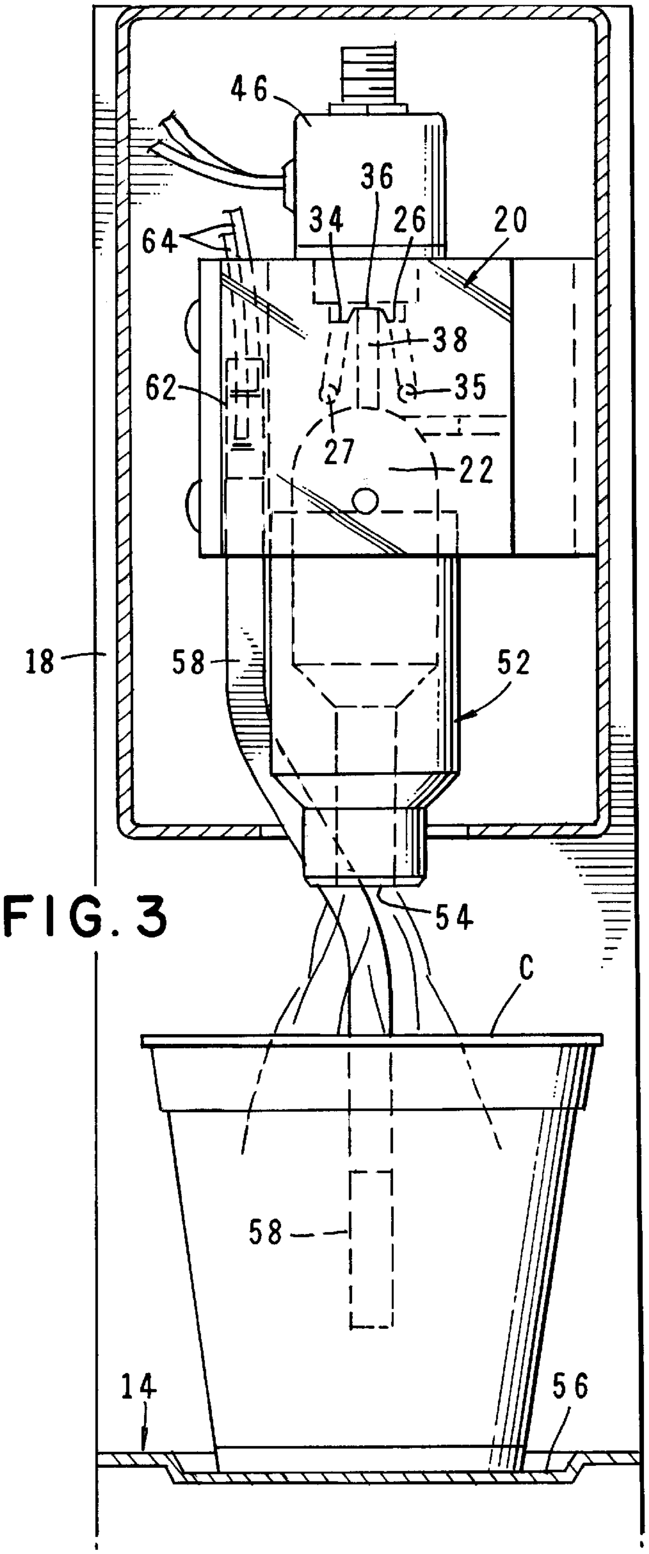
FIG. 3 is a cross-sectional view taken along lines 3—3 of FIG. 2.
Figure 4:
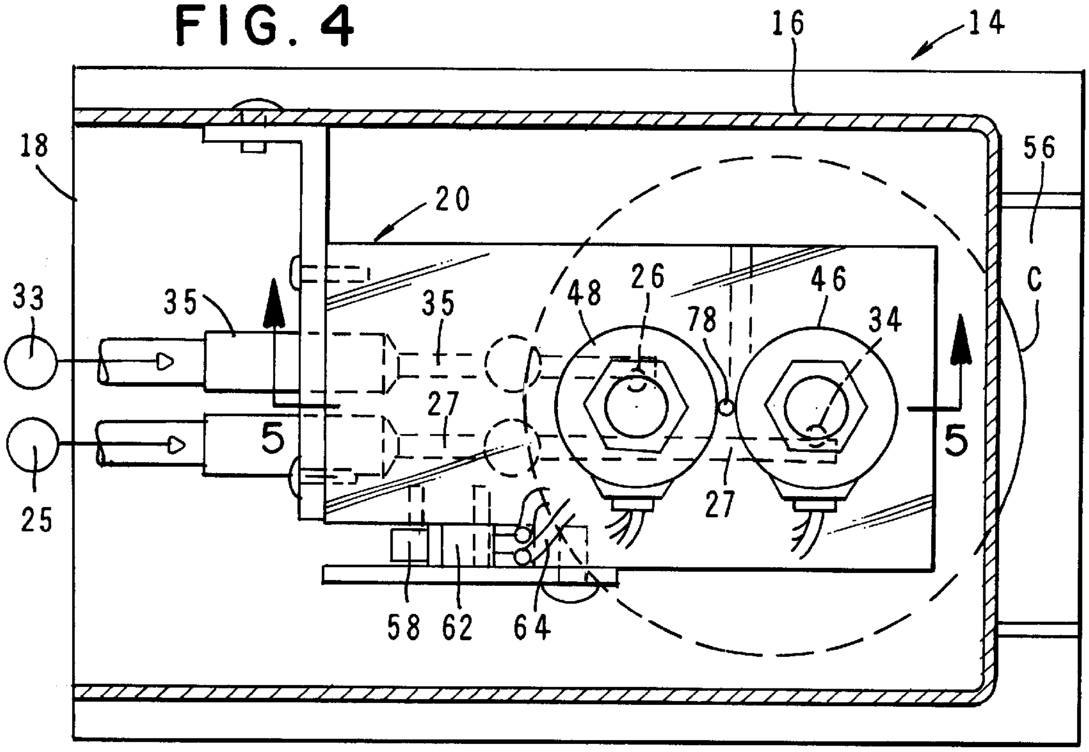
FIG. 4 is a cross-sectional view taken along lines 4—4 of FIG. 2.

Connected to mixing block 20 is syrup injection means for injecting a collimated stream of syrup into mixing chamber 20 along a first path. Also connected to mixing block 20 is water injection means for injecting a collimated stream of water into chamber 22 of the mixing block along a second path that intersects the first path at an intersection point 23 (FIG. 5). The water injection means here comprises a water receiving chamber 24 having an inlet 26 and an outlet 28 (FIGS. 2 and 4). As best seen in FIG. 2 outlet 28 is in communication with mixing chamber 22 via a flow conduit or passageway 30 formed in mixing block 20. Similarly, the syrup injection means comprises a syrup receiving chamber 32 having an inlet 34 and an outlet 36. Outlet 36 is also in communication with mixing chamber along a flow conduit 38 formed in mixing block 20 (FIG. 3). As shown in FIG. 4, a source of syrup 25 is in communication in the inlet 34 of syrup receiving chamber 32 via a passageway 27 and a source of water 33 is in communication with the inlet 26 of water receiving chamber 24 via a passageway 35. With this construction, chamber 32 is at all times filled with syrup and chamber 24 is at all times filled with water.

Disposed between inlet 34 and outlet 36 is a first valve means for controlling the flow of syrup from chamber 32 toward said mixing chamber 22. Similarly a second valve means is disposed between inlet 26 and outlet 28 for controlling the flow of water from chamber 24 toward mixing chamber 22. In the present form of the invention, the first valve means comprises a first solenoid valve 46 while the second valve means comprises a second solenoid 48. The purpose out of these solenoid valves will presently be described.

Sealably interconnected with chamber 22 by means of a conventional O-ring 50 is a dispensing nozzle 52 (FIG. 5). Nozzle 52 includes an outlet port 54 which, as shown in FIGS. 2 and 3, is superimposed over a cup supporting platform 56 which forms a part of base unit 14. Cup supporting 56 is adapted to support a receptacle such as beverage cup “C” in the manner shown in FIGS. 2 and 3. As illustrated in FIG. 2, movement of cup “C” into position beneath dispensing nozzle 52 will operate a switch means for operating first and second solenoids 46 and 48.

The switch operating means of the present invention here comprises a downwardly depending lever arm 58 that is pivotally connected to block 20 at a pivot point 60. When lever arm 58 is moved by the cup “C” from the position shown in the phantom lines in FIG. 2 to the position shown in the solid lines in FIG. 2, lever arm 58 will pivot about point 60 and in so doing will close a conventional switch, generally designated in the drawings by the numeral 62. Switch 62 is electrically interconnected with solenoids 46 and 48 by electrical conduits 64. Switch 62 which is of a conventional, readily commercially available construction is interconnected with solenoids 46 and 48 and with switch operating means 58 in a manner well known to those skilled in the art.

Referring particularly to FIG. 5, it can be seen that both solenoid valves 46 and 48 are of a similar construction with each comprises an electro-magnet 66, a magnetic core 68, and a valve disk 70. Each of the solenoid valves 46 and 48 is normally biased into a closed position by coiled springs 72 where valve disks 70 close the outlet ports 28 and 32 (see FIG. 5A). However, when switch 62 is actuated by lever arm 58 so as to close the switch, each of the magnetic cores of the solenoid valves will be drawn upwardly by magnets 66 against the urging of springs 72. This upward movement in the direction of the arrows 59 in FIG. 5 will separate valve disks 70 from outlets 28 and 36 thus permitting the flow of water and syrup from chambers 24 and 36 in a direction toward passageways 30 and 38 respectively. So long as the solenoid valves are in the open position shown in FIG. 5, collimated streams of water and syrup will flow under pressure into chamber 22 and toward intersection point 23 where the water and syrup will tend to intermix. In this regard, an important feature of the apparatus of the invention resides in the configuration of the water injection means which here comprises a water injection nozzle 76. Nozzle 76, which has the unique configuration shown in FIGS. 8 and 9, includes a generally tubular body portion 76*a* and a flatened end portion 76*b* defining an elongated slit-like, water-injection port 76*c* (FIG. 9). Injection port 76 functions to direct the water toward intersection point 23 at a velocity sufficient to cause a turbulent intermixing of the water and syrup. As will be presently discussed in greater detail, the simultaneous injection of a collimated stream of air under pressure into chamber 22 in the manner shown in FIG. 5 will cause the efficient whipping of the syrup and water mixture.

To prevent vacuum buildup within chamber 22, vent means are provided for drawing air into mixing chamber 22 along a flow path defined by air passageway 78 which is in communication with atmosphere (FIG. 5). As indicated in FIG. 5, as the air enters chamber 22 along a third flow path, it will effectively prevent a vacuum buildup within the chamber permitting the whipped beverage to be freely dispensed into cup “C” via the dispensing nozzle 52.

In operation of the apparatus, with the water line 35 suitably interconnected with the source of water 33 and with the syrup line 27 suitably interconnected with the source of syrup 25, the apparatus is in condition for preparing and dispensing the whipped beverage. The mixing and dispensing step is commenced by the inserting cup “C” into the apparatus in the manner illustrated in FIG. 2. As the cup moves into the dispensing position on cup-supporting platform 56, it will move lever arm 58 from the position shown in the phantom lines in FIG. 2 to the position shown in the solid lines in FIG. 2. As the lever arm moves into this second dispensing position, it will pivot about pivot point 60 causing switch 62 to close thereby energizing solenoid valves 46 and 48. As the solenoid valves are energized, the cores 68 of the valves will be urged upwardly by electromagnetics 66 from the closed position shown in FIG. 5A to the valve open position shown in FIG. 5.

Figure 6:
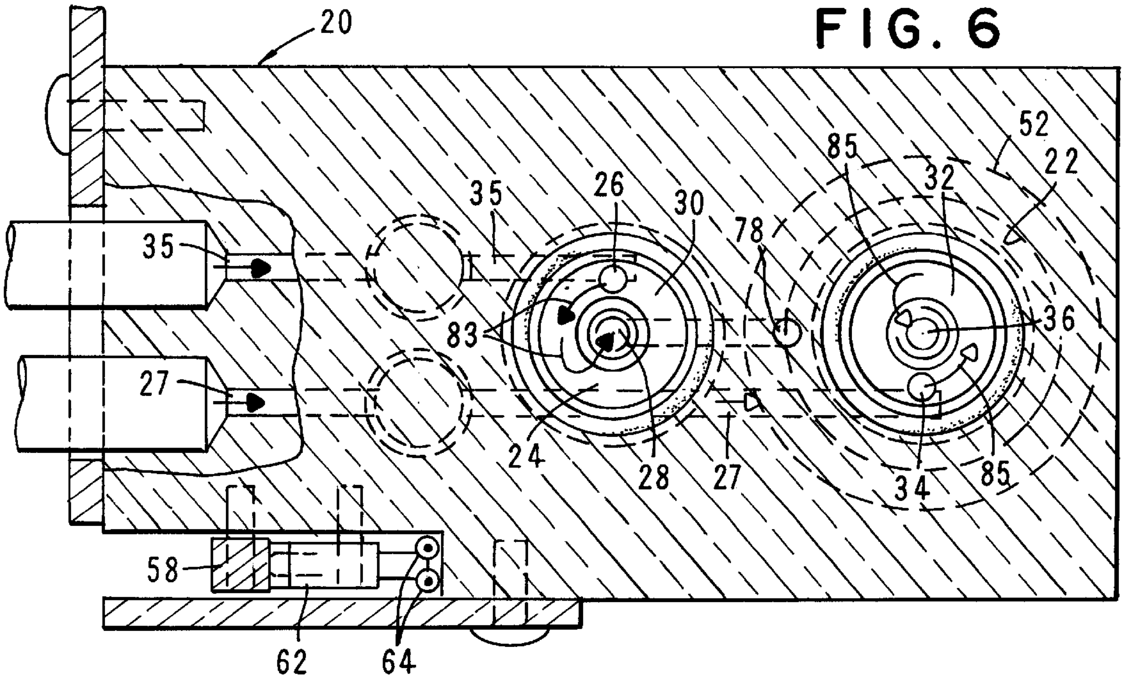
FIG. 6 is a cross-sectional view taken along lines 6—6 of FIG. 5.

With the solenoid valves in the open position, water will be permitted to flow from chamber 24 toward mixing chamber 22 with replenishing water flowing into chamber 32 from water source 33 (note the arrows 83 of FIG. 6). Similarly, syrup will be permitted to flow from chamber 32 toward mixing chamber 22 and replenishing syrup will flow into chamber 32 from syrup source 25 (note the arrows 85 in FIG. 6).

Figure 8:
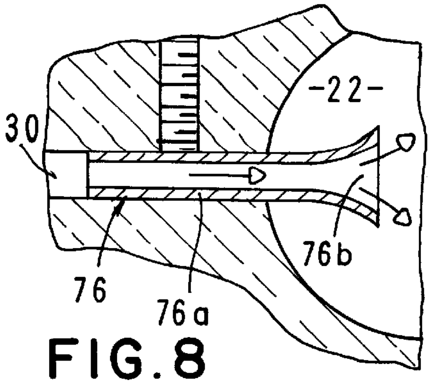
FIG. 8 is an enlarged, fragmentary, cross-sectional view illustrating the novel configuration of the water dispensing conduit of the apparatus.
Figure 9:
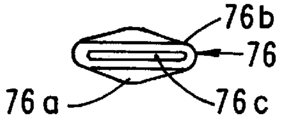
FIG. 9 is a front view of the water-dispensing conduit shown in FIG. 8 illustrating the novel configuration of the dispensing outlet.
Figure 7:
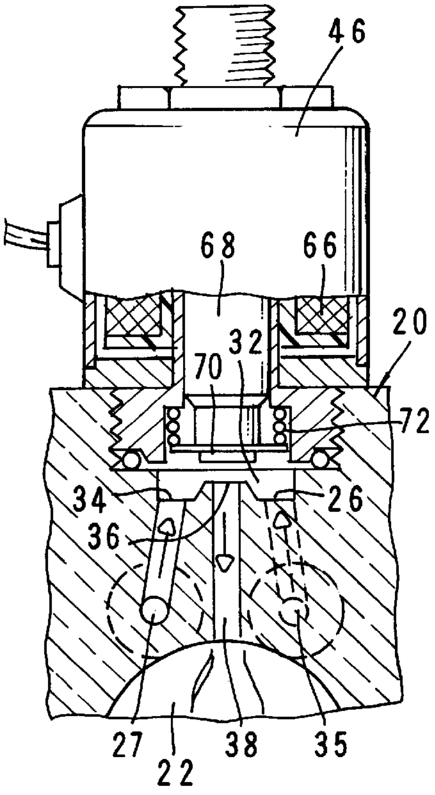
FIG. 7 is a cross-sectional view taken along lines 7—7 of FIG. 5.

As illustrated in FIG. 5, the water flowing under pressure outwardly of chamber 24 via outlet 28 will enter flow passageway 30 and will be dispensed into mixing chamber 22 via the uniquely configured water injection nozzle 76 (see FIGS. 8 and 9). Simultaneously, syrup will flow from chamber 32 into mixing chamber 22 via flow passageway 38 where it will intersect the flow of water at the intersection point 23 shown in FIG. 5. Due to the novel configuration of water injection nozzle 76, a turbulent mixing of the water and syrup will occur at the intersection point. As this mixing occurs, air will flow into chamber 22 via passageway 78 thereby preventing vacuum buildup within the chamber.

The whipped beverage formed in the manner described in the preceding paragraphs will be dispensed into cup “C” via dispensing nozzle 52 in the manner indicated in FIG. 3. When the cup has been filled and is removed from platform 56 the position shown by the phantom lines in FIG. 1, switch operating arm 58 will return to its starting configuration thereby de-energizing solenoids 46 and 48. Upon de-energization of the solenoids, spring 72 will urge cores 68 along with valve disk 70 into the closed position depicted in FIG. 5A. The apparatus will remain in this static configuration until another cup “C” is moved into the dispensing position shown in the solid lines in FIG. 1 which once again closes the switch means of the invention and the energization of solenoids 46 and 48.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. An apparatus for producing and dispensing a whipped beverage comprising a mixture of syrup, water and air, said apparatus comprising:

(a) a vented mixing chamber;

(b) syrup injection means for injecting a stream of syrup into said vented mixing chamber along a first path;

(c) water injection means for injecting a stream of water into said vented mixing chamber along a second path that intersects said first path at an intersection point to impinge upon said stream of syrup to form a first mixture of syrup and water, said water injection means comprising a water injection nozzle that includes a generally tubular shaped body portion and a flattened end portion defining an elongated slit for directing the water toward said intersection point at a velocity sufficient to cause a turbulent mixing of the water and syrup; and (d) a dispensing means operably associated with said vented mixing chamber for dispensing said whipped beverage.

2. The apparatus as defined in claim 1 in which said syrup injection means comprises:

(a) a syrup receiving chamber having an inlet and an outlet, said outlet being in communication with said mixing chamber;

(b) a source of syrup in communication with said inlet of said syrup receiving chamber; and (c) a first valve means disposed between said inlet and said outlet for controlling the flow of syrup toward said mixing chamber.

3. The apparatus as defined in claim 2 in which said first valve means comprises a first solenoid valve.

4. The apparatus as defined in claim 1 in which said water injection means comprises:

(a) a water receiving chamber having an inlet and an outlet, said outlet being in communication with said mixing chamber;

(b) a source of water in communication with said inlet of said water receiving chamber; and (c) a second valve means disposed between said inlet and said outlet for controlling the flow of water toward said mixing chamber.

5. The apparatus as defined in 4 claim in which said second valve means comprises a second solenoid valve.

6. An apparatus for producing and dispensing a whipped beverage comprises a mixture of syrup, water and air, said apparatus comprising:

(a) a base having a cup-supporting platform;

(b) a hollow housing superimposed over said base;

(c) a mixing block disposed within said hollow housing, said mixing block having a mixing chamber;

(d) vent means provided in said mixing block for venting said mixing chamber to atmosphere;

(e) syrup injection means for injecting a collimated stream of syrup into said mixing chamber of said mixing block along a first path, said syrup injection means comprising:

(i) a syrup receiving chamber having an inlet and an outlet, said outlet being in communication with said mixing chamber;

(ii) a source of syrup in communication with said inlet of said syrup receiving chamber;

(iii) a first valve means disposed between said inlet and said outlet for controlling the flow of syrup toward said mixing chamber, said first valve means comprising a first solenoid valve; and (f) water injection means for injecting a collimated stream of water into said mixing chamber of said mixing block along a second path that intersects said first path at an intersection point to impinge upon said stream of syrup to form a first mixture of syrup and water, said water injection means comprising:

(i) a water receiving chamber having an inlet and an outlet, said outlet being in communication with said mixing chamber;

(ii) a source of water in communication with said inlet of said water in receiving chamber;

(iii) a second valve means disposed between said inlet and said outlet for controlling the flow of water and toward said mixing chamber, said second valve means comprising a second solenoid valve; and (iv) a water injection nozzle in communication with said source of water, said water injection nozzle comprising a body portion having a flattened end portion defining an elongated water injection port; and (g) dispensing means operably associated with said mixing chamber for dispensing said whipped beverage.

7. The apparatus as defined in claim 6 including switch means for operating said first and second solenoid valves.

8. The apparatus as defined in claim 7 further including switch operating means pivotally connected to said mixing block for operating said switch means.

9. An apparatus for producing and dispensing into a receptacle a whipped beverage comprising a mixture of syrup, water and air, said apparatus comprising:

(a) a base having a cup supporting platform;

(b) a hollow housing superimposed over said base;

(c) a mixing block disposed within said upper hollow housing, said mixing block having a mixing chamber;

(d) vent means provided in said mixing block for venting said mixing chamber to atmosphere, said vent means comprising an air passageway formed in said mixing block;

(e) syrup injection means for injecting a stream of syrup into said mixing chamber of said mixing block along a first path, said syrup injection means comprising:

(i) a syrup receiving chamber having an inlet and an outlet, said outlet being in communication with said mixing chamber;

(ii) a source of syrup in communication with said inlet of said syrup receiving chamber;

(iii) a first valve means disposed between said inlet and said outlet for controlling the flow of syrup toward said mixing chamber, said first valve means comprising a first solenoid valve;

(f) water injection means for injecting a stream of water into said mixing chamber of said mixing block along a second path that intersects said first path at an intersection point to form a first mixture of syrup and water, said water injection means comprising:

(i) a water receiving chamber having an inlet and an outlet, said outlet being in communication with said mixing chamber;

(ii) a source of water in communication with said inlet of said water in receiving chamber via a water injection nozzle that includes a generally tubular shaped body portion and a flattened end portion defining an elongated water injection port for directing the water toward said intersection point at a high velocity to cause a turbulent mixing of the air, water and syrup;

(iii) a second valve means disposed between said inlet and said outlet for controlling the flow of water toward said water injection nozzle, said second valve means comprising a second solenoid valve;

(g) a dispensing means operably associated with said mixing chamber for dispensing said whipped beverage.

10. The apparatus defined in claim 9 including switch means for operating said first and second solenoid valves.

11. The apparatus as defined in claim 10 further including switch operating means pivotally connected to said mixing block for operating said switch means, said switch operating means comprising a lever arm pivotally connected to said mixing block for engagement by the receptacle.

* * * * *